(12) United States Patent
Shi et al.

(10) Patent No.: US 8,670,294 B1
(45) Date of Patent: *Mar. 11, 2014

(54) SYSTEMS AND METHODS FOR INCREASING MEDIA ABSORPTION EFFICIENCY USING INTERFEROMETRIC WAVEGUIDES

(75) Inventors: Zhong Shi, Dublin, CA (US); Shing Lee, Fremont, CA (US); Hongxing Yuan, San Ramon, CA (US); Sergei Sochava, Sunnyvale, CA (US); Ronald L. Allen, San Jose, CA (US); Yunfei Li, Fremont, CA (US); Michael Morelli, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 13/399,250

(22) Filed: Feb. 17, 2012

(51) Int. Cl.
*G11B 7/00* (2006.01)
*G11B 5/00* (2006.01)

(52) U.S. Cl.
USPC .................. 369/13.24; 369/13.33; 360/59

(58) Field of Classification Search
USPC ........ 369/112.27, 13.24, 13.32, 13.33, 13.01, 369/13.02, 13.26; 360/59
See application file for complete search history.

(56) References Cited

U.S. PATENT DOCUMENTS

| | | |
|---|---|---|
| 5,173,909 A | 12/1992 | Sakano et al. |
| 5,199,090 A | 3/1993 | Bell |
| 5,341,391 A | 8/1994 | Ishimura |
| 5,960,014 A | 9/1999 | Li et al. |
| 6,275,453 B1 | 8/2001 | Ueyanagi et al. |
| 6,671,127 B2 | 12/2003 | Hsu et al. |
| 6,687,195 B2 | 2/2004 | Miyanishi et al. |
| 6,795,630 B2 | 9/2004 | Challener et al. |
| 6,834,027 B1 | 12/2004 | Sakaguchi et al. |
| 6,975,580 B2 | 12/2005 | Rettner et al. |
| 7,027,700 B2 | 4/2006 | Challener |
| 7,042,810 B2 | 5/2006 | Akiyama et al. |
| 7,171,080 B2 | 1/2007 | Rausch |
| 7,190,539 B1 | 3/2007 | Nibarger |
| 7,266,268 B2 * | 9/2007 | Challener et al. ............... 385/37 |
| 7,272,079 B2 | 9/2007 | Challener |

(Continued)

FOREIGN PATENT DOCUMENTS

| | | |
|---|---|---|
| EP | 1498878 A2 | 1/2005 |
| EP | 1501076 A1 | 1/2005 |

OTHER PUBLICATIONS

Chubing Peng, "Surface-plasmon resonance of a planar lollipop near-field transducer", Applied Physics Letters 94, 171106 (2009), 3 pages.

*Primary Examiner* — Thomas Alunkal

(57) ABSTRACT

Systems and methods for increasing media absorption efficiency using interferometric waveguides in information storage devices are described. One such system for an interferometric waveguide assembly includes a light source, a first waveguide arm and a second waveguide arm, a splitter configured to receive light from the light source and to split the light into the first waveguide arm and the second waveguide arm, and a near field transducer (NFT) configured to receive the light from the first waveguide arm and the second waveguide arm, where the first waveguide arm and the second waveguide arm converge to form a preselected angle at a junction about opposite the splitter, and where the first waveguide arm and the second waveguide arm are configured to induce a preselected phase difference in the light arriving at the NFT.

29 Claims, 4 Drawing Sheets

(56) References Cited

U.S. PATENT DOCUMENTS

| | | |
|---|---|---|
| 7,330,404 B2 | 2/2008 | Peng et al. |
| 7,440,660 B1 * | 10/2008 | Jin et al. ............................ 385/43 |
| 7,486,709 B2 | 2/2009 | Hu et al. |
| 7,500,255 B2 | 3/2009 | Seigler et al. |
| 7,567,387 B2 | 7/2009 | Itagi et al. |
| 7,596,072 B2 | 9/2009 | Buechel et al. |
| 7,649,677 B2 | 1/2010 | Jin et al. |
| 8,077,557 B1 * | 12/2011 | Hu et al. .................... 369/13.24 |
| 2001/0006435 A1 | 7/2001 | Ichihara et al. |
| 2001/0017820 A1 | 8/2001 | Akiyama et al. |
| 2003/0184903 A1 | 10/2003 | Challener |
| 2003/0198146 A1 | 10/2003 | Rottmayer et al. |
| 2004/0001394 A1 * | 1/2004 | Challener et al. .......... 369/13.32 |
| 2004/0001420 A1 | 1/2004 | Challener |
| 2004/0027728 A1 | 2/2004 | Coffey et al. |
| 2004/0228022 A1 | 11/2004 | Ueyanagi |
| 2005/0047013 A1 | 3/2005 | Le et al. |
| 2005/0078565 A1 * | 4/2005 | Peng et al. .................. 369/13.32 |
| 2005/0122850 A1 * | 6/2005 | Challener et al. .......... 369/13.24 |
| 2005/0289576 A1 | 12/2005 | Challener |
| 2007/0081426 A1 | 4/2007 | Lee et al. |
| 2007/0081427 A1 | 4/2007 | Suh et al. |
| 2008/0055343 A1 | 3/2008 | Cho et al. |
| 2008/0180827 A1 | 7/2008 | Zhu et al. |
| 2008/0181560 A1 | 7/2008 | Suh et al. |
| 2008/0198496 A1 | 8/2008 | Shimazawa et al. |
| 2008/0232225 A1 | 9/2008 | Cho et al. |
| 2011/0235480 A1 * | 9/2011 | Goulakov et al. .......... 369/13.35 |
| 2012/0020195 A1 * | 1/2012 | Seigler ....................... 369/13.32 |
| 2012/0039155 A1 * | 2/2012 | Peng et al. ................. 369/13.14 |

* cited by examiner

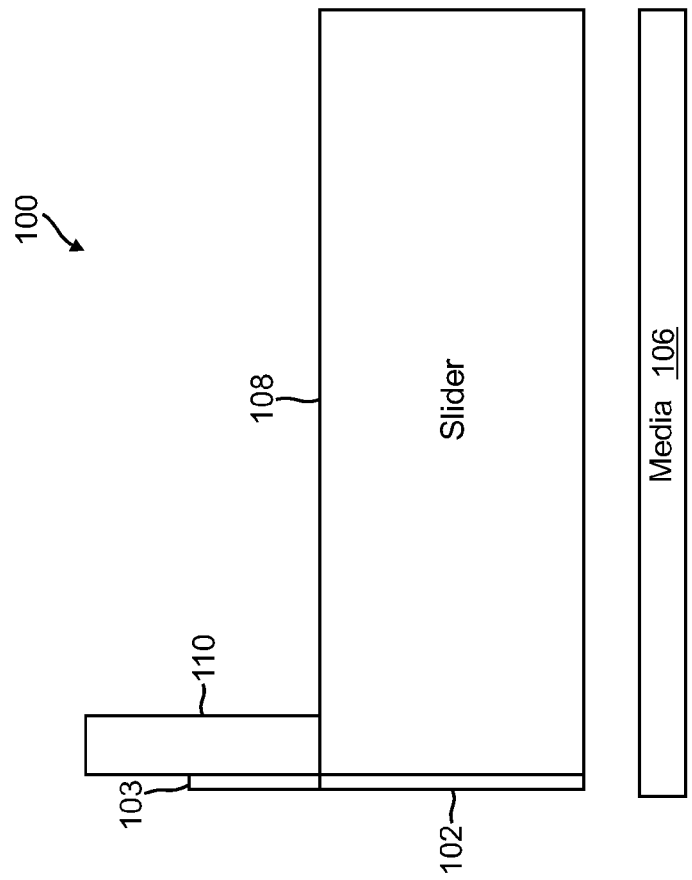
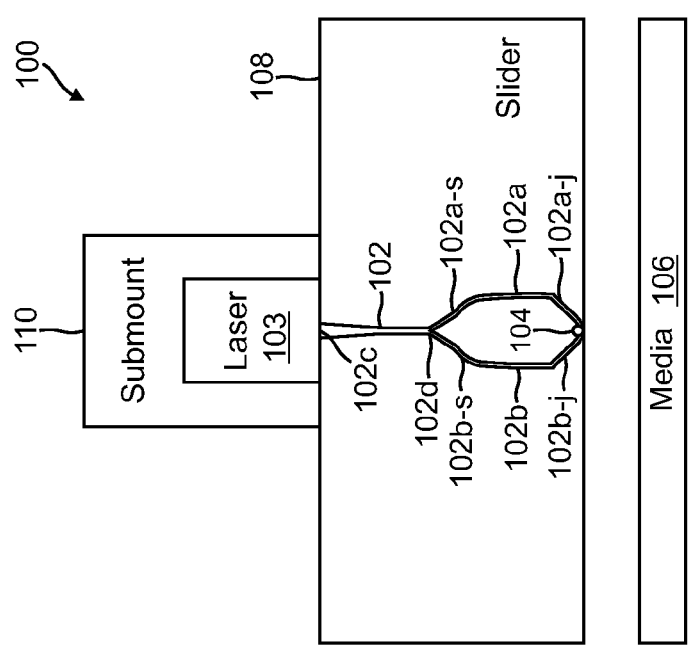

UNEQUAL LENGTH

UNEQUAL WIDTH

PHASE RETARDER

HEATER

ELECTRIC FIELD

Y-SPLITTER

MMI SPLITTER

DIRECTIONAL COUPLER SPLITTER

SYSTEMS AND METHODS FOR INCREASING MEDIA ABSORPTION EFFICIENCY USING INTERFEROMETRIC WAVEGUIDES

FIELD

The present invention relates to information storage devices, and more specifically to systems and methods for increasing media absorption efficiency using interferometric waveguides in information storage devices.

BACKGROUND

Energy assisted magnetic recording (EAMR) or heat assisted magnetic recording (HAMR) technology is often used to increase areal density of information storage devices such as magnetic disks. In these assisted recording systems, a laser beam is delivered through an optical waveguide and interacts with a near field transducer (NFT) that absorbs part of the optical energy and forms a very strong localized electromagnetic field in the near field region. When the localized electromagnetic field is close enough to the recording medium, the recording medium absorbs part of the localized electromagnetic field energy and heats up thermally, which helps to realize the whole magnetic recording process.

A primary design goal of EAMR involves getting high media absorption efficiency. Media absorption efficiency is defined as energy being absorbed by media layers divided by incident light energy in the optical waveguide. A key challenge to improving media absorption efficiency is to find a waveguide structure that provides strong interactions between the waveguide mode and the near field transducer (NFT). The stronger the interactions between these components, the stronger the electrical field produced by NFT will be. Therefore, given the strong interactions between the waveguide mode and the NFT, the media absorption efficiency will be larger.

A number of different light delivery designs have been proposed in an attempt to maximize NFT efficiency. One such design uses a planar waveguide with a parabolic solid immersion mirror to focus laser light on a disk-shaped NFT. The key to realizing this structure is to properly introduce a pi phase shift between the light waves coming to the NFT from the opposite sides of the parabolic mirror.

Another design uses a channel waveguide to deliver light to an aperture based NFT. The light is coupled into the optical channel waveguide via a mode converter and is guided to the vicinity of the NFT. At the air bearing surface (ABS) side, the light interacts with an NFT and forms a very strong localized electrical field.

However, the above described designs provide weak interaction between incident light and the NFT resulting in low media absorption efficiency. In addition, these designs impose some challenges to the EAMR manufacturing processes due to tight process tolerances. As such, an improved waveguide structure for increasing media absorption efficiency without negatively impacting current optical waveguide manufacturing processes is needed.

SUMMARY

Aspects of the invention relate to systems and methods for increasing media absorption efficiency using interferometric waveguides in information storage devices. In one embodiment, the invention relates to an interferometric waveguide assembly including a light source, a first waveguide arm and a second waveguide arm, a splitter configured to receive light from the light source and to split the light into the first waveguide arm and the second waveguide arm, and a near field transducer (NFT) configured to receive the light from the first waveguide arm and the second waveguide arm, where the first waveguide arm and the second waveguide arm converge to form a preselected angle at a junction about opposite the splitter, and where the first waveguide arm and the second waveguide arm are configured to induce a preselected phase difference in the light arriving at the NFT.

In another embodiment, the invention relates to a method for forming an interferometric waveguide assembly, the method including forming a reader, forming a return pole on the reader, forming a cladding layer on the return pole, forming a core layer on the cladding layer, forming the interferometric waveguide assembly within the core layer, where the interferometric waveguide assembly includes a first waveguide arm and a second waveguide arm, and a splitter configured to receive light from a light source and to split the light into the first waveguide arm and the second waveguide arm, where the first waveguide arm and the second waveguide arm converge to form a preselected angle at a junction about opposite the splitter, and where the first waveguide arm and the second waveguide arm are configured to induce a preselected phase difference in the light arriving at a near field transducer (NFT), and forming a write pole on the waveguide assembly.

BRIEF DESCRIPTION OF THE DRAWINGS

FIG. 1a is a front view of an energy assisted magnetic recording (EAMR) head assembly including an interferometric waveguide configured to receive light from a laser and to direct the received light to a near field transducer (NFT) that directs light energy on to a magnetic media, where the waveguide is configured to efficiently maximize the media light energy absorption by inducing a preselected phase difference in the light travelling along two waveguide arms in accordance with one embodiment of the invention.

FIG. 1b is a side view of the EAMR head assembly of FIG. 1a including the interferometric waveguide positioned within a slider and the laser mounted to a submount attached to the slider in accordance with one embodiment of the invention.

DETAILED DESCRIPTION

Figure 2:
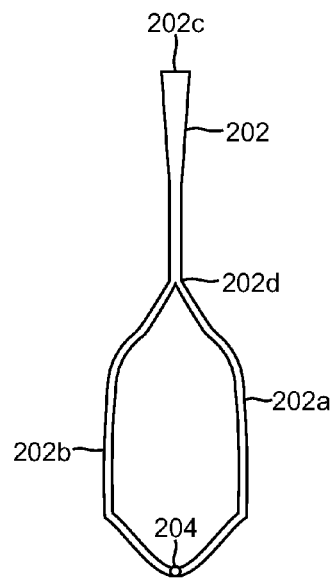
FIG. 2 is a top view of an interferometric waveguide configured to induce a preselected phase difference in the light travelling along two waveguide arms using different side wall angles, thicknesses, or materials for the waveguide arms in accordance with one embodiment of the invention.

Referring now to the drawings, embodiments of systems and methods for increasing media absorption efficiency in an energy assisted magnetic recording (EAMR) head assembly using interferometric waveguides are illustrated. In many embodiments, the EAMR head assemblies with the interferometric waveguides are configured for use within an information storage device. The interferometric waveguides include two waveguide arms configured to induce a preselected phase difference (phase delay or phase advance) in the light passing through the one of the two waveguide arms to efficiently maximize the light energy absorption of a magnetic recording media of the storage device.

The preselected phase delay or phase advance can be accomplished using a number of different configurations. These configurations can include embodiments where one waveguide arm has an unequal length, an unequal width, an unequal thickness, different materials, and/or different side wall angles than the other waveguide arm. In other embodiments, one waveguide arm may be acted on by a phase retarder, a heater, and/or an electric field. In each case, the interferometric waveguide configuration can induce the preselected phase difference in the light arriving at a near field transducer positioned near a junction where the waveguide arms converge. In such case, the light travelling through the waveguide can be effectively converted into thermal energy delivered to one or more media disks of a storage device. In several embodiments, the preselected phase difference is an odd multiple of 180 degrees (or pi radians).

FIG. 1a is a front view of an energy assisted magnetic recording (EAMR) head assembly 100 including an interferometric waveguide 102 configured to receive light from a laser 103 and to direct the received light to a near field transducer (NFT) 104 that directs light energy on to a magnetic media 106, where the waveguide 102 is configured to efficiently maximize the media light energy absorption by inducing a preselected phase difference in the light travelling along two waveguide arms (102a, 102b) in accordance with one embodiment of the invention. The waveguide 102 is mounted to a slider 108 (e.g., magnetic transducer for a magnetic storage device). The laser 103 is mounted to a submount 110 that is mounted to the slider 108.

The light from the laser 103 is received at an upper waveguide inlet 102c and then split into the first waveguide arm 102a and second waveguide arm 102b at an optical splitter 102d. Light travelling along the first waveguide arm 102a is delayed or advanced by the preselected phase difference using one or more of a number of techniques for controlling the phase difference, described in detail below, and efficiently and constructively combines with the light from the second waveguide arm 102b at the NFT 104. The NFT 104 then converts the light energy into near-field electromagnetic energy and directs it into the media 106. In several embodiments, the preselected phase difference is an odd multiple of 180 degrees, or (2n+1) multiplied by 180 degrees where n is an integer.

Along the waveguide 102 and at a point between the waveguide inlet 102c and the splitter 102d extending to the first waveguide arm 102a and second waveguide arm 102b, the waveguide 102 forms two S-shaped bends (102a-s, 102b-s). Each of the waveguide arms (102a, 102b) extends downward from the S-shaped bends (102a-s, 102b-s) and then changes direction inward at a joining arm (102a-j, 102b-j). The joining arms (102a-j, 102b-j) converge at a junction occupied by the NFT 104. The joining arms (102a-j, 102b-j) form a preselected angle selected from the range of about 80 degrees to about 140 degrees. In another embodiment, the preselected angle is selected from a smaller range of about 100 degrees to about 120 degrees.

In several embodiments, the preselected phase difference is induced when one of the waveguide arms has an unequal length, an unequal width, different materials, and/or different side wall angles as compared to the other waveguide arm. In other embodiments, the preselected phase difference is induced when one of the waveguide arms is acted on by a phase retarder, a heater, and/or an electric field. In yet other embodiments, the preselected phase difference is induced when one of the waveguide arms has unequal side wall angle, thickness, or another suitable waveguide arm characteristic. In one embodiment, the laser can be replaced with another suitable light source. In several embodiments, the splitter can be a Y-splitter, a multi-mode interference (MMI) splitter, a directional coupler splitter, another suitable splitter known in the art, or some combination of these splitters.

In the embodiment illustrated in FIG. 1a, the preselected phase difference is accomplished, at least in part, by making a characteristic of one of the two waveguide arms different from the other arm. In other embodiments, the preselected phase difference can be accomplished using other suitable implementations. For example, co-pending U.S. patent application Ser. No., entitled, "SYSTEMS AND METHODS FOR CONTROLLING LIGHT PHASE AT NEAR FIELD TRANSDUCERS OF INTERFEROMETRIC WAVEGUIDES", having Ser. No. 13/399,325, the entire content of which is expressly incorporated herein by reference, describes a number of suitable techniques for accomplishing the preselected phase difference for an interferometric waveguide that involve controllably heating the light source.

FIG. 1b is a side view of the EAMR head assembly 100 of FIG. 1a including the interferometric waveguide 102 positioned within the slider 108 and the laser 103 mounted to the submount 110 attached to the slider 108 in accordance with one embodiment of the invention.

FIG. 2 is a top view of an interferometric waveguide 202 configured to induce a preselected phase difference in the light travelling along two waveguide arms (202a, 202b) using different side wall angles, thicknesses, or materials for the waveguide arms in accordance with one embodiment of the invention. Similar to the interferometric waveguide of FIGS. 1a and 1b, light is received by the waveguide 202 at the upper waveguide inlet 202c and then split into the first waveguide arm 202a and second waveguide arm 202b at an optical splitter 202d. Light travelling along the first waveguide arm 202a is delayed or advanced by the preselected phase difference and efficiently and constructively combines with the light from the second waveguide arm 202b at the NFT 204. In several embodiments, the splitter 204d splits the light between the first waveguide arm 202a and second waveguide arm 202b equally. In another embodiment, the light is delayed or advanced along the second waveguide arm 202b rather than the first waveguide arm 202a.

In one embodiment for varying the side wall angles, for example, the side wall angle of the second waveguide arm is set to about 90 degrees, while the side wall angle of the first waveguide arm is varied from about 78 degrees to about 102 degrees to achieve the desired preselected phase difference (e.g., about 180 degrees). In one embodiment for varying the waveguide arm materials, for example, the material of the second waveguide arm 202b includes $Ta_2O_5$ and/or AN, while the material of the first waveguide 202a arm includes SiNxOy, where x and y have suitable values as known in the art. In other embodiments, other suitable side wall angles and materials can be used.

In several embodiments, the first and second waveguide arms (202a, 202b) have a rectangular cross section (e.g., of a core area of the waveguide). In such case, a thickness (e.g., height of the rectangular cross section) of the second waveguide arm, which is also the core thickness, can be set to a preselected thickness, and the thickness of the first waveguide arm can be set to a preselected thickness, where the thicknesses are different to achieve the desired preselected phase difference. In one such embodiment, the thickness of the second waveguide is about 120 nm, while the thickness of the first waveguide arm is about 160 nm when the core width is about 550 nm and configured with a $Ta_2O_5$ core and $SiO2$ cladding. In other embodiments, other suitable thicknesses can be used. In other embodiments, the waveguide arms can have other suitable cross section shapes.

Figure 3:
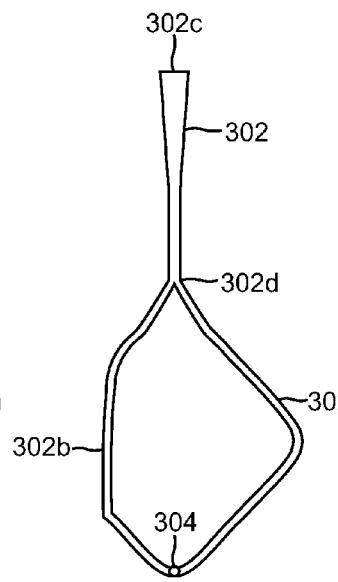
FIG. 3 is a top view of an interferometric waveguide configured to induce a preselected phase difference in the light travelling along two waveguide arms using unequal waveguide arm lengths in accordance with one embodiment of the invention.

FIG. 3 is a top view of an interferometric waveguide 302 configured to induce a preselected phase difference in the light travelling along two waveguide arms (302a, 302b) using unequal waveguide arm lengths in accordance with one embodiment of the invention. Similar to several of the interferometric waveguides described above, light is received by the waveguide 302 at the upper waveguide inlet 302c and then split into the first waveguide arm 302a and second waveguide arm 302b at an optical splitter 302d. Light travelling along the first waveguide arm 302a is delayed or advanced by the preselected phase difference and efficiently and constructively combines with the light from the second waveguide arm 302b at the NFT 304.

As can be seen in FIG. 3, the first waveguide arm 302a is substantially longer than the second waveguide arm 302b. For example, the length difference between the waveguide arms can be about 200 nm to about 300 nm, or an odd integer multiple of such values. In one embodiment, the first waveguide arm 302a has a length of about 100 microns, and the second waveguide arm 302b has a length of about 100.25 microns. In other embodiments, other suitable lengths can be used to provide the desired preselected phase difference. In several embodiments, the desired preselected phase difference is an odd integer multiple of about 180 degrees or pi radians.

Figure 4:
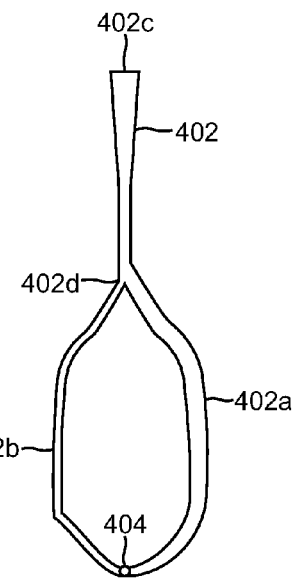
FIG. 4 is a top view of an interferometric waveguide configured to induce a preselected phase difference in the light travelling along two waveguide arms using unequal waveguide arm widths in accordance with one embodiment of the invention.

FIG. 4 is a top view of an interferometric waveguide 402 configured to induce a preselected phase difference in the light travelling along two waveguide arms (402a, 402b) using unequal waveguide arm widths in accordance with one embodiment of the invention. Similar to several of the interferometric waveguides described above, light is received by the waveguide 402 at the upper waveguide inlet 402c and then split into the first waveguide arm 402a and second waveguide arm 402b at an optical splitter 402d. Light travelling along the first waveguide arm 402a is delayed or advanced by the preselected phase difference and efficiently and constructively combines with the light from the second waveguide arm 402b at the NFT 404.

As can be seen in FIG. 4, the first waveguide arm 402a is wider than the second waveguide arm 402b. For example, the first waveguide arm 402a has a width of about 500 to 600 nm, and the second waveguide arm 402b has a width of about 500 nm. In other embodiments, other suitable widths can be used to provide the desired preselected phase difference. In several embodiments, the desired preselected phase difference is an odd integer multiple of about 180 degrees or pi radians. In one embodiment, a waveguide width difference of about 5 nm can cause about 30 degrees phase variation across the waveguide structure 402.

Figure 5:
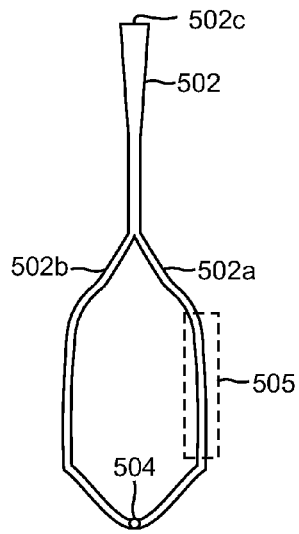
FIG. 5 is a top view of an interferometric waveguide configured to induce a preselected phase difference in the light travelling along two waveguide arms using a phase retarder on one of the waveguide arms in accordance with one embodiment of the invention.

FIG. 5 is a top view of an interferometric waveguide 502 configured to induce a preselected phase difference in the light travelling along two waveguide arms (502a, 502b) using a phase retarder 505 on one 502a of the waveguide arms in accordance with one embodiment of the invention. Similar to several of the interferometric waveguides described above, light is received by the waveguide 502 at the upper waveguide inlet 502c and then split into the first waveguide arm 502a and second waveguide arm 502b at an optical splitter 502d. Light travelling along the first waveguide arm 502a is delayed or advanced by the preselected phase difference and efficiently and constructively combines with the light from the second waveguide arm 502b at the NFT 504.

Light is delayed by the phase retarder 505 which is implemented as a thin or plane like sheet of metallic material positioned above the first waveguide arm 502a. The phase retarder 505 is configured to induce the preselected phase delay/difference. In other embodiments, the phase retarder 505 can be positioned in another suitable configuration (e.g., below or along a side of the first waveguide arm 502a) such that the phase retarder 505 is sufficiently near the first waveguide arm 502a to have the intended effect on the phase delay. In one embodiment, the phase retarder 505 is about 9 micrometers in length. In other embodiments, the length can be adjusted to achieve a preselected phase delay. In one embodiment, the phase retarder 505 is made of gold or a gold alloy. In other embodiments, the phase retarder 505 can be made of other suitable materials.

Figure 6:
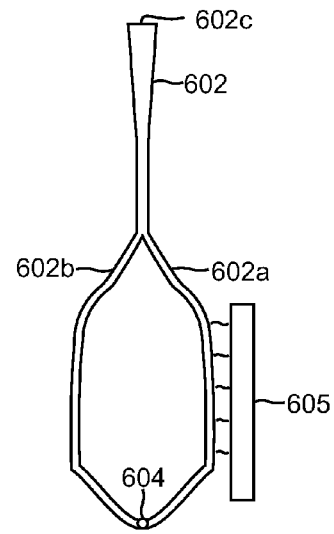
FIG. 6 is a top view of an interferometric waveguide configured to induce a preselected phase difference in the light travelling along two waveguide arms using a heater on one of the waveguide arms in accordance with one embodiment of the invention.

FIG. 6 is a top view of an interferometric waveguide 602 configured to induce a preselected phase difference in the light travelling along two waveguide arms (602a, 602b) using a heater 605 on one of the waveguide arms 602a in accordance with one embodiment of the invention. Similar to several of the interferometric waveguides described above, light is received by the waveguide 602 at the upper waveguide inlet 602c and then split into the first waveguide arm 602a and second waveguide arm 602b at an optical splitter 602d. Light travelling along the first waveguide arm 602a is delayed or advanced by the preselected phase difference and efficiently and constructively combines with the light from the second waveguide arm 602b at the NFT 604.

Light is delayed or advanced due to the heat applied by the heater 605 positioned proximate the first waveguide arm 502a. The heater 605 is configured to provide a preselected amount of heat to induce the preselected phase difference. In one embodiment, the heater 605 is implemented as a controllable heat source such as a spiral trace or another suitable trace configuration as known in the art. In other embodiments, the heater 605 can be implemented in other suitable configurations known in the art.

Figure 7:
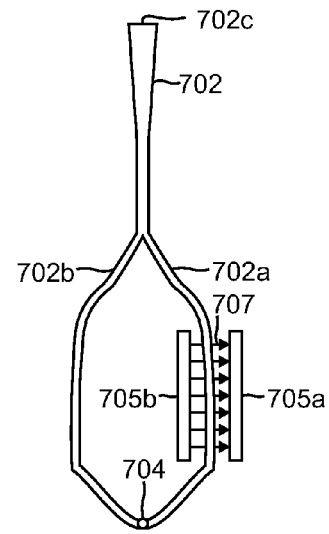
FIG. 7 is a top view of an interferometric waveguide configured to induce a preselected phase difference in the light travelling along two waveguide arms using an electric field applied between two electrodes on one of the waveguide arms in accordance with one embodiment of the invention.

FIG. 7 is a top view of an interferometric waveguide 702 configured to induce a preselected phase difference in the light travelling along two waveguide arms (702a, 702b) using an electric field applied between two electrodes (705a, 705b) on one 702a of the waveguide arms in accordance with one embodiment of the invention. Similar to several of the interferometric waveguides described above, light is received by the waveguide 702 at the upper waveguide inlet 702c and then split into the first waveguide arm 702a and second waveguide arm 702b at an optical splitter 702d. Light travelling along the first waveguide arm 702a is delayed or advanced by the preselected phase delay and efficiently and constructively combines with the light from the second waveguide arm 702b at the NFT 704.

Light is delayed or advanced by the electric field 707 extending between electrodes 705a and 705b and across the first waveguide arm 702a. The electric field 707 is configured to induce the preselected phase difference. In one embodiment, a voltage of about 30 to 50 volts applied between the two electrodes 705a and 705b to achieve a sufficient electric field and the preselected phase difference. In other embodiments, the electric field 707 can be implemented using other suitable configurations known in the art. In other embodiments, the electrodes can be positioned in different configurations. In one such embodiment, for example, one electrode is positioned above the waveguide arm and the other below the waveguide arm.

Figure 8A:
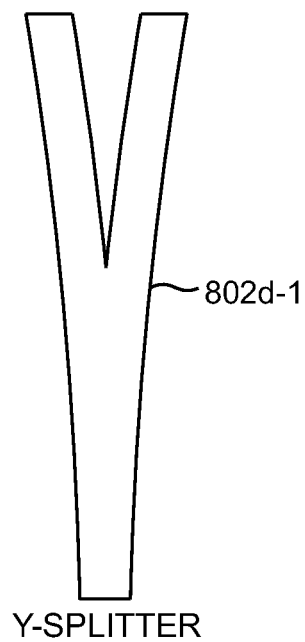
FIG. 8a is a top schematic view of a Y-splitter that can be used in an interferometric waveguide to split received light into two separate waveguide arms in accordance with one embodiment of the invention.

FIG. 8a is a top schematic view of a Y-splitter 802d-1 that can be used in an interferometric waveguide to split received light into two separate waveguide arms in accordance with one embodiment of the invention. In several embodiments, the Y-splitter 802d-1 can be used in any of the interferometric waveguides described above. In one embodiment, Y-splitter 802d-1 can be used to split received light equally between two waveguide arms. In another embodiment, Y-splitter 802d-1 can be used to split received light unequally between two waveguide arms.

Figure 8B:
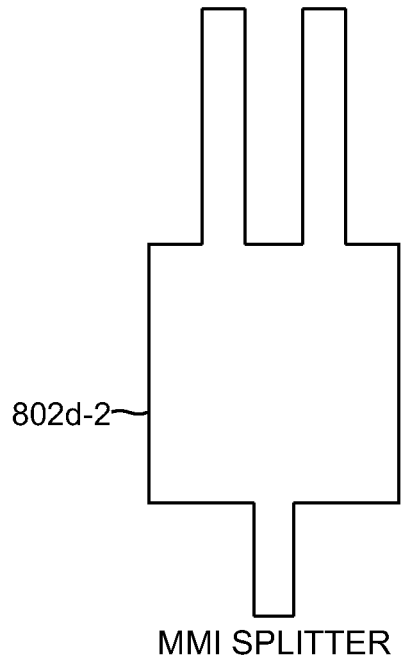
FIG. 8b is a top schematic view of a multi-mode interference (MMI) splitter that can be used in an interferometric waveguide to split received light into two separate waveguide arms in accordance with one embodiment of the invention.

FIG. 8b is a top schematic view of a multi-mode interference (MMI) splitter 802d-2 that can be used in an interferometric waveguide to split received light into two separate waveguide arms in accordance with one embodiment of the invention. In several embodiments, the MMI splitter 802d-2 can be used in any of the interferometric waveguides described above. In one embodiment, MMI splitter 802d-2 can be used to split received light equally between two waveguide arms. In another embodiment, MMI splitter 802d-2 can be used to split received light unequally between two waveguide arms.

Figure 8C:
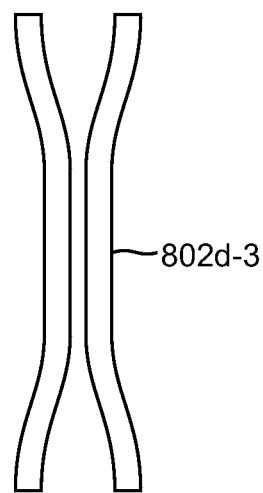
FIG. 8c is a top schematic view of a directional coupler splitter that can be used in an interferometric waveguide to split received light into two separate waveguide arms in accordance with one embodiment of the invention.

FIG. 8c is a top schematic view of a directional coupler splitter 802d-3 that can be used in an interferometric waveguide to split received light into two separate waveguide arms in accordance with one embodiment of the invention. In several embodiments, the directional coupler splitter 802d-3 can be used in any of the interferometric waveguides described above. In one embodiment, directional coupler splitter 802d-3 can be used to split received light equally between two waveguide arms. In another embodiment, directional coupler splitter 802d-3 can be used to split received light unequally between two waveguide arms.

Figure 9:
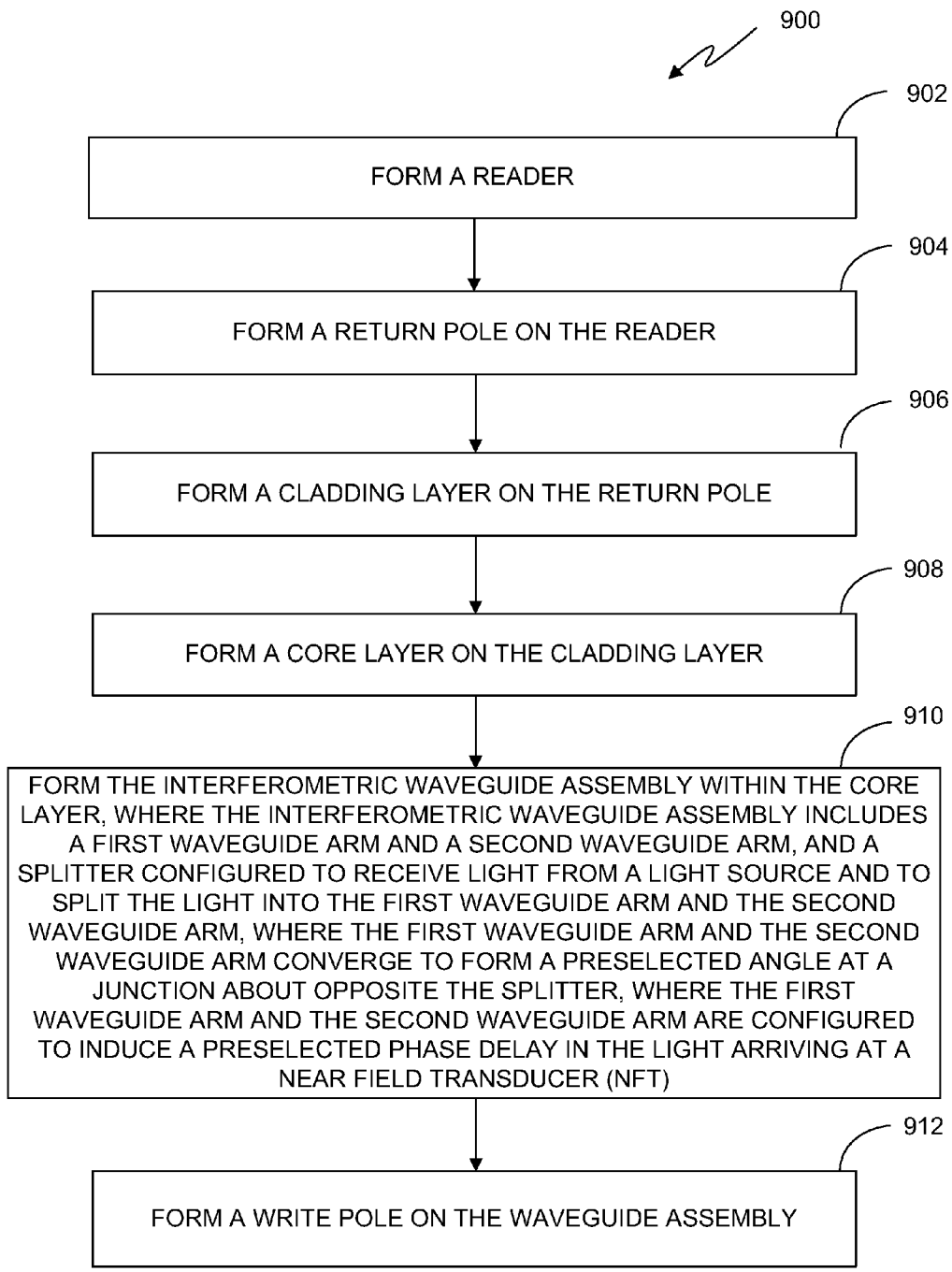
FIG. 9 is a flow chart of a process for manufacturing an interferometric waveguide configured to receive light from a light source and to direct the received light to a near field transducer (NFT) that directs light energy on to a magnetic media, where the waveguide is configured to efficiently maximize the media light energy absorption by inducing a preselected phase difference in the light travelling along one of the two waveguide arms in accordance with one embodiment of the invention.

FIG. 9 is a flow chart of a process 900 for manufacturing an interferometric waveguide configured to receive light from a light source and to direct the received light to a near field transducer (NFT) that directs light energy on to a magnetic media, where the waveguide is configured to efficiently maximize the media light energy absorption by inducing a preselected phase difference in the light travelling along one of the two waveguide arms in accordance with one embodiment of the invention. In particular embodiments, the manufacturing process can be used to form one of the interferometric waveguides described above. The process first forms (902) a reader. The process then forms (904) a return pole on the reader. The process forms (906) a cladding layer on the return pole. The process then forms (908) a core layer on the cladding layer.

The process then forms (910) the interferometric waveguide assembly within the core layer. The interferometric waveguide assembly can include a first waveguide arm and a second waveguide arm, and a splitter configured to receive light from a light source and to split the light into the first waveguide arm and the second waveguide arm, where the first waveguide arm and the second waveguide arm converge to form a preselected angle at a junction about opposite the splitter, and where the first waveguide arm and the second waveguide arm are configured to induce a preselected phase difference in the light arriving at a near field transducer (NFT). The process then forms (912) a write pole on the waveguide assembly.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

In a number of embodiments described above, the preselected phase difference is effected on a particular waveguide arm of an interferometric waveguide having two waveguide arms. However, in many embodiments, the preselected phase difference can be effected on either one of the two waveguide arms of the interferometric waveguide.

What is claimed is:

1. An interferometric waveguide assembly comprising:
a light source;
a first waveguide arm and a second waveguide arm;
a splitter configured to receive light from the light source and to split the light into the first waveguide arm and the second waveguide arm; and
a near field transducer (NFT) configured to receive the light from the first waveguide arm and the second waveguide arm,
wherein the first waveguide arm and the second waveguide arm converge to form a preselected angle at a junction opposite the splitter in a light propagating direction, and
wherein the first waveguide arm and the second waveguide arm are configured to induce a preselected phase difference in the light arriving at the NFT.

2. The waveguide assembly of claim 1, wherein the NFT is proximate the junction.

3. The waveguide assembly of claim 1, wherein the preselected phase difference is about 180 degrees multiplied by (2n+1), where n is an integer.

4. The waveguide assembly of claim 1, wherein the preselected angle ranges from about 80 degrees to about 140 degrees, inclusive.

5. The waveguide assembly of claim 1, wherein the first waveguide arm and the second waveguide arm comprise a different characteristic to induce the preselected phase difference, wherein the characteristic is selected from the group consisting of a width, a length, a material, a side wall angle, and combinations thereof.

6. The waveguide assembly of claim 1, further comprising a phase retarder positioned proximate the first waveguide arm, the phase retarder comprising a preselected material and configured to induce the preselected phase difference.

7. The waveguide assembly of claim 1, further comprising a heat source proximate the first waveguide arm, the heat source configured to induce the preselected phase difference.

8. The waveguide assembly of claim 1, further comprising an electrode positioned proximate the first waveguide arm, the electrode configured to apply an electric field to the first waveguide arm and thereby induce the preselected phase difference.

9. The waveguide assembly of claim 1, wherein the splitter is configured to split the light about equally between the first waveguide arm and the second waveguide arm.

10. The waveguide assembly of claim 1, wherein the splitter comprises a preselected splitter selected from the group consisting of a Y-splitter, a multi-mode interference splitter, a directional coupler splitter, and combinations thereof.

11. The waveguide assembly of claim 1, wherein each of the first waveguide arm and the second waveguide arm comprise an S-bend extending to a joining arm, and wherein each of the joining arms converges at the junction proximate the NFT.

12. The waveguide assembly of claim 1, wherein the light source comprises a laser.

13. The waveguide assembly of claim 1:
wherein the waveguide assembly is positioned proximate a magnetic media disk, and
wherein the NFT is configured to convert the received light into electromagnetic energy and direct the electromagnetic energy on a preselected area of the media disk.

14. A method for forming an interferometric waveguide assembly, the method comprising:
forming a reader;
forming a return pole on the reader;
forming a cladding layer on the return pole;
forming a core layer on the cladding layer;
forming the interferometric waveguide assembly within the core layer, wherein the interferometric waveguide assembly comprises:
a first waveguide arm and a second waveguide arm; and
a splitter configured to receive light from a light source and to split the light into the first waveguide arm and the second waveguide arm,
wherein the first waveguide arm and the second waveguide arm converge to form a preselected angle at a junction opposite the splitter in a light propagating direction, and
wherein the first waveguide arm and the second waveguide arm are configured to induce a preselected phase difference in the light arriving at a near field transducer (NFT); and
forming a write pole on the waveguide assembly.

15. The method of claim 14, further comprising forming the NFT on the interferometric waveguide assembly.

16. The method of claim 14, wherein the forming the interferometric waveguide assembly on the core layer comprises:
forming the NFT on the core layer; and
forming the interferometric waveguide assembly on the NFT.

17. The method of claim 14:
wherein the forming the reader comprises forming a write shield on the reader;
wherein the forming the return pole on the reader comprises forming the return pole on the write shield; and
wherein the forming the write pole on the waveguide assembly comprises:
forming the NFT;
forming a heat sink on the NFT;
depositing the write pole on the heat sink;
shaping the write pole; and
depositing a top cladding layer on the shaped write pole.

18. The method of claim 14, wherein the NFT is proximate the junction.

19. The method of claim 14, wherein the preselected phase difference is about 180 degrees multiplied by (2n+1), where n is an integer.

20. The method of claim 14, wherein the preselected angle ranges from about 80 degrees to about 140 degrees, inclusive.

21. The method of claim 14, wherein the first waveguide arm and the second waveguide arm comprise a different characteristic to induce the preselected phase difference, wherein the characteristic is selected from the group consisting of a width, a length, a material, a side wall angle, and combinations thereof.

22. The method of claim 14, further comprising a phase retarder positioned proximate the first waveguide arm, the phase retarder comprising a preselected material and configured to induce the preselected phase difference.

23. The method of claim 14, further comprising a heat source proximate the first waveguide arm, the heat source to induce the preselected phase difference.

24. The method of claim 14, further comprising an electrode positioned proximate the first waveguide arm, the electrode configured to apply an electric field to the first waveguide arm and thereby induce the preselected phase difference.

25. The method of claim 14, wherein the splitter is configured to split the light about equally between the first waveguide arm and the second waveguide arm.

26. The method of claim 14, wherein the splitter comprises a preselected splitter selected from the group consisting of a Y-splitter, a multi-mode interference splitter, a directional coupler splitter, and combinations thereof.

27. The method of claim 14, wherein each of the first waveguide arm and the second waveguide arm comprise an S-bend extending to a joining arm, and wherein each of the joining arms converges at the junction proximate the NFT.

28. The method of claim 14, wherein the light source comprises a laser.

29. The method of claim 14:
wherein the waveguide assembly is positioned proximate a magnetic media disk, and
wherein the NFT is configured to convert the received light into electromagnetic energy and direct the electromagnetic energy on a preselected area of the media disk.

* * * * *